July 19, 1966     F. O. LEONARD     3,261,320

MARINE FENDER

Filed April 30, 1965

INVENTOR.
FRANK O. LEONARD
BY
*J. B. Holden*
ATTORNEY

United States Patent Office 3,261,320
Patented July 19, 1966

3,261,320
MARINE FENDER
Frank O. Leonard, Cuyahoga Falls, Ohio, assignor to The Goodyear Tire & Rubber Company, Akron, Ohio, a corporation of Ohio
Filed Apr. 30, 1965, Ser. No. 452,139
6 Claims. (Cl. 114—219)

This invention relates to resilient bumpers and in particular to bumpers which are useful as marine fenders either attached to tug boats and other vessels or used as shock absorbing devices mounted on marine docks to protect the dock and vessels in proximity to the docks from damage due to contact of the vessel with the dock. This device can also be used on truck docks and on other vehicles.

In the past many forms of rubber bumpers or fenders have been used on marine vessels, docks and other applications. One of the problems encountered in the past has been the difficulty of securing the fenders to the dock or vessel in a simple manner which will prevent dislocation and tearing away of the fenders and which will permit easy installation or removal for maintenance of damaged portions of the fender.

Many of the prior art devices have been complicated in design and were therefore difficult to manufacture and assemble. Many required special holes or protuberances for fastening the bumper to the dock or vessel.

Another problem encountered with many of the prior art bumpers has been their lack of adaptability to different dock structures and vessel contours.

In the past most resilient bumpers were made substantially solid or with a single longitudinal bore to provide a more resilient bumper which requires less material to manufacture. The solid bumpers required some means of fastening them to a dock or vessel such as special holes or brackets or other complicated devices. The bumpers having a single longitudinal bore could be mounted with metal brackets passing through the bore but when more than one bracket passed through the same bore the resulting metal to metal contact often resulted in damage or destruction of the brackets and loosening of the bumpers.

Another problem encountered when bumpers having a single bore are mounted on the prow of a ship, is that when the ship rubs against another vessel, the other vessel may tend to catch the bumper and move it vertically up or down away from its normal position and leave a portion of the prow unprotected. This occurs most often when both vessels are bobbing up and down due to waves or other turbulence.

A primary object of the invention is the provision of a resilient bumper having a double longitudinal bore which eliminates metal to metal contact of the mounting brackets passing through the bores thereby giving better shock absorbing characteristics and longer wear of the bumper.

Another object of this invention is to provide a fender which, by its design and shape, resists undesirable vertical movement when mounted on the prow of a ship.

Still another object of the invention is the provision of a resilient bumper which is simple and inexpensive to manufacture and install and in which the inherent contour of the bumper eliminates the need for special openings or protuberances for fastening the bumper to the object on which it is to be mounted.

A still further object of the invention is the provision of a bumper which is multi-purpose and can be mounted on marine vessels or on docks and can be used in direct contact with the dock or vessel or as an intermediate shock absorbing device between timbers or other bumper structures.

These and other objects and advantages of the invention will appear from the following specification and the accompanying drawings wherein.

Figure 1:
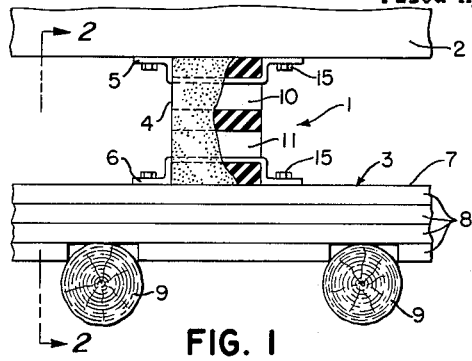
FIG. 1 is a plan view of one embodiment of the invention.
Figure 2:
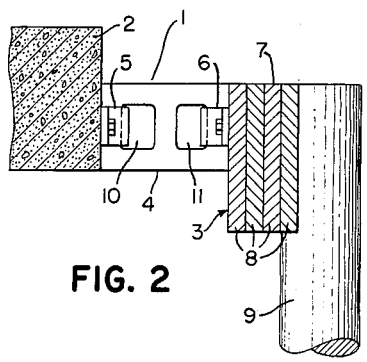
FIG. 2 is a cross-sectional view of the invention taken along line 2—2 of FIG. 1.

Referring now to the drawings and in particular to FIGS. 1 and 2, the numeral 1 indicates generally the bumper assembly of one embodiment of the invention. The bumper assembly 1 is mounted on a dock structure 2. The dock is shown as made of concrete for the purposes of illustrating the invention. However, it will be understood that the dock may be made of wood or any other suitable material. The bumper assembly 1 consists of a bumper guard 3 in spaced relation to the dock 2, a plurality of cushioning members 4 between the dock 2 and the bumper guard 3. Each cushioning member is attached to the dock 2 by a bracket 5 (shown in FIG. 4) which may be described as hat-shaped, and to the bumper guard 3 by a similar bracket 6. In many instances, the brackets 5 and 6 may be identical.

The bumper guard 3 consists of a beam like member 7 made from a plurality of boards or other structural members 8 arranged in contiguous relationship to each other and fastened together by bolts or other suitable means. The beams 7 are arranged horizontally with respect to the dock and are spaced apart from the dock 2 by the cushioning members 4. A typical cushioning member 4 may be seen in FIG. 3 and will hereafter be described in more detail. A plurality of vertical pilings 9 are attached to the beam member 7 at spaced positions therealong. The pilings 9 are mounted on the side of the beam 7 which faces outwardly from the dock. The pilings 9 are the portions of the bumper which will first be contacted by a vessel approaching the dock. When a vessel contacts the vertical pilings 9 the shock of impact of the vessel is transmitted from the pilings 9 through the beam 7 to the cushioning members 4 which absorb the impact shock and prevent damage to both the dock 2 and the vessel.

Figure 3:
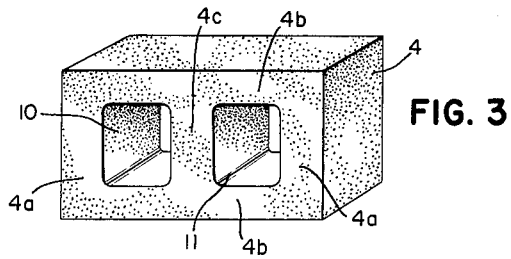
FIG. 3 is a perspective view of the resilient cushioning member of the invention.

The cushioning member 4, for the purposes of illustrating the invention, is shown in FIG. 3 as a length of an extruded section of a generally rectangular shape having a pair of opposite parallel sidewalls 4a and another pair of longer opposite parallel sidewalls 4b integrally connected to the ends thereof, the one pair of sidewalls 4a being perpendicular to the other pair of sidewalls 4b, thereby forming a hollow body which has a continuous integral imperforate center wall 4c, dividing the hollow interior of the cushioning member 4 into two substantially rectangular shaped openings 10 and 11 extending longitudinally therethrough which are fully enclosed by the sidewalls and the center wall except at the ends of the body member. The cushioning member 4 may be made from any suitable resilient material such as rubber or plastic and if desired may be molded, cast or made by any other manufacturing method. The cushioning members 4 and 21 may be reinforced with woven material, textile fibers, wire glass fibers or filaments. If an extrusion is used, it is obvious that it may be cut to the desired length with the length being determined by the particular requirements of the specific application for which it is to be used. In certain embodiments of the bumper assembly, more than two openings may be required through each cushioning member. Such a construction might be useful in the embodiment shown in FIGS. 5 and 6. Any required number of openings may be used, but to illustrate the invention two openings are shown as the preferred number. Each of the cushioning members 4 is positioned between the dock 2 and the bumper guard 3 with the opening 10 nearest the dock and the opening 11 nearest the bumper guard 3.

Figure 4:
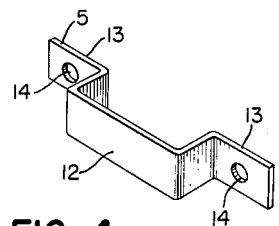
FIG. 4 is a perspective view of a bracket for holding the cushioning member of the invention.

The bracket 5 shaped as shown in FIG. 4, passes through the opening 10 to attach the cushioning member 4 to the dock 2. A similar bracket 6 passes through the opening 11 to attach the cushioning member 4 to the beam member 7. The brackets 5 and 6 may be stamped from sheet metal, cast or made by any suitable manufacturing method. Both the brackets 5 and 6 have an imperforate U-shaped center segment 12 which passes through openings 10 and 11 in each cushioning member 4 and conforms to the contour of the part of the opening which it contacts. A flange 13 having a hole 14 therethrough extends outwardly from each end of the center segment 12. When the cushioning member 4 is positioned between the dock 2 and the bumper guard 3, the flanges 13 of the bracket 5 lie flat against the vertical edge of the dock 2 and the flanges 13 of the bracket 6 lie flat against the beam 7. The brackets 5 and 6 are then attached to the dock 2 and the beam 7 respectively by bolts or screws 15 passing through the holes 14. The length of the brackets 5 and 6 will depend upon the length of the cushioning member 4.

Any number of cushioning members 4 may be used between the dock 2 and the bumper guard 3 depending upon the size of the dock and the length of dock area to be covered by a bumper.

It will be seen that deflection of the bumper due to impact is absorbed in shear loading when the deflection is in the longitudinal direction and in compression loading when the loading is in the normal direction. In a typical dock application, a combination of normal and shear loading exists. Even with maximum deflection of the bumper, metal to metal contact of the mounting brackets 5 and 6 does not occur since the cross-sectional configuration of the bumper allows each mounting bracket to be insulated from the other by the center wall 4c. A single bore bumper requires that both brackets be positioned in the same bore with the result that when the bumper is deflected sufficiently under load, the metal brackets would contact each other. This would deform them so that they would tear or cut the rubber cushioning member 4 and in many instances would break loose under the stresses of continued use.

The cushioning member 4 as shown in FIGS. 1 and 2 is mounted with the longitudinal openings arranged horizontally. In some applications it may be desirable to mount the cushioning members so that the openings are vertically arranged or with some of the openings vertical and some horizontal. The particular mounting arrangement used will depend upon the structure to be cushioned and the type of loading it will be subjected to.

Figure 5:
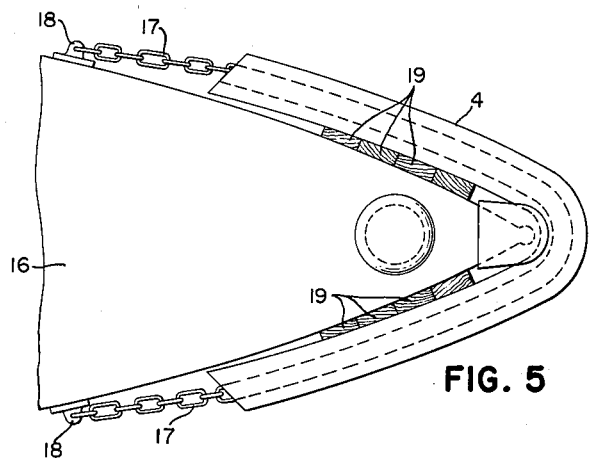
FIG. 5 is a plan view of a marine vessel showing the resilient bumper of the invention attached to the vessel.
Figure 6:
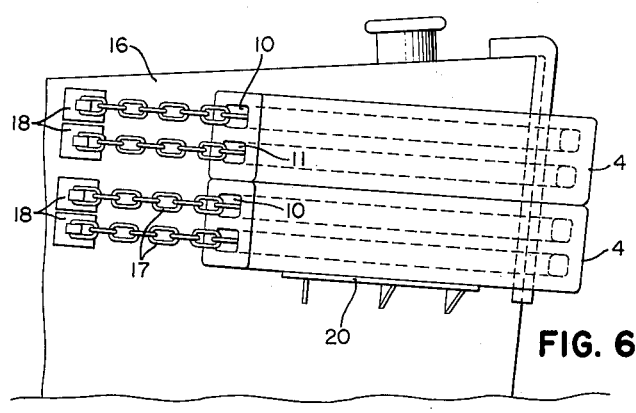
FIG. 6 is an elevational view of the embodiment shown in FIG. 5.

Referring now to another embodiment of the invention, a marine vessel 16 shown in FIGS. 5 and 6 carries a pair of the resilient cushioning members 4 wrapped around the bow to serve as fenders to protect the vessel 16 and any other vessels which it may contact, from damage resulting from impact between the two vessels or from contact of the vessel 16 with other objects. When using the cushioning member 4 to protect the bow of the vessel 16 it is necessary to use a longer segment than is necessary when using it as a dock bumper as shown in FIGS. 1 and 2. In FIGS. 5 and 6 two lengths of the cushioning member 4 are wrapped around the bow of the ship 16 in a V shape configuration with one member resting on top of the other. A supporting chain 17 passes through each of the openings 10 and 11 in both sections of the cushioning member 4. Each end of the chains 17 is anchored to a plurality of brackets 18 which are attached to the vessel 16. A plurality of wood spacer blocks 19 may be placed on either side of the vessel 16 to prevent the cushioning members from directly contacting the sides near the point of the bow. An auxiliary support platform 20 is located on each side of the hull of the vessel 16 in such position as to support the bottom cushioning member 4. The top cushioning member 4 is in turn supported by the bottom cushioning member. If a larger area of the vessel needs protection this can be accomplished by increasing the number of cushioning members used and/or using greater lengths of the cushioning members 4. If a smaller area is to be protected one cushioning member might be sufficient.

When a typical single bore fender is attached to a point on each side of a vessel in a manner similar to the cushioning member 4 in FIGS. 5 and 6, it tends to pivot about the attachment points when it is pushed upward or downward and leaves a portion of the bow unprotected. This situation occurs when two vessels rub together while they are bobbing up and down in the water. Since the cushioning member 4 is wider than the typical single bore fender its width prevents it from tending to pivot about its points of attachment, thereby minimizing undesirable vertical movement of the cushioning member 4. With the cushioning member 4 attached to two brackets 18 on each side of the vessel instead of one as in the single bore fender, such arrangement further resists vertical movement of the cushioning member 4 and helps to retain it in the desired position to protect the vessel.

Figure 7:
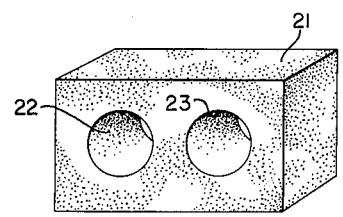
FIG. 7 is a perspective view similar to FIG. 3 showing another embodiment of the invention.

Referring now to FIG. 7 it will be seen that the cushioning member 21 is similar to the cushioning member 4 in FIG. 3 except that the longitudinal openings 22 and 23 in the cushioning member 21 are round instead of square as shown in FIG. 3. Either round or square openings may be used in the various embodiments of this invention.

Figure 8:
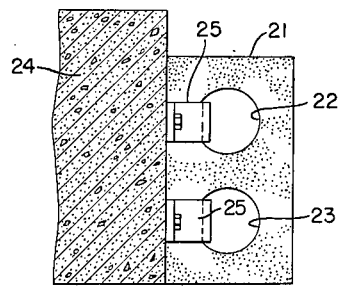
FIG. 8 shows another means of attaching the resilient bumper to a dock.

In FIG. 8 the cushioning member 21 having round openings 22 and 23 is fastened to a dock 24 by a pair of brackets 25, one passing longitudinally through the opening 22 and the other through the opening 23. The cushioning member 21 is positioned with one of its wider surfaces against the dock 24 so that both openings 22 and 23 are equidistant from the vertical outward face thereof. When this fastening arrangement is used, the cushioning member 21 absorbs the shock of impact directly rather than indirectly as in the assembly shown in FIGS. 1 and 2 which uses a bumper guard. In this embodiment the bumper or fender assembly consists of merely the cushioning member 21 and the brackets 18. As shown in FIG. 8 the brackets 25 are substantially smaller in cross-section than the openings 22 and 23 and when assembled with the cushioning member 21, the brackets 25 bear against one side of the openings 22 and 23 leaving a substantial portion of the openings unfilled by the brackets thereby providing greater resilience of the cushioning member. When used with the cushioning member 21, the brackets 18 may be made with their center portion curved to conform to the contour of the round openings 22 and 23.

While certain representative embodiments and details have been shown for the purpose of illustrating the invention it will be apparent to those skilled in this art that various changes and modifications may be made therein without departing from the spirit or scope of the invention.

What is claimed is:

1. A bumper assembly for attachment to a structure comprising:
   (A) An impact receiving bumper guard in spaced relation to the structure;
   (B) An elongated resilient, cushioning member of substantially uniform cross section having a hollow interior and at least one continuous integral imperforate center wall dividing the hollow interior into a plurality of longitudinally disposed parallel openings, said cushioning member positioned between the structure and the bumper guard;
   (C) Removable means passing longitudinally through the opening in the part of the cushioning member nearest the structure for attaching the cushioning member to the structure and
   (D) Means passing longitudinally through the opening in the part of the cushioning member nearest the bumper guard for attaching the bumper guard to the cushioning member, so that the cushioning member absorbs the shock of impact of an object striking the bumper.

2. A bumper assembly as claimed in claim 1 in which the cushioning member consists of a plurality of sections of extruded elastomeric material.

3. A bumper assembly as claimed in claim 2 in which the cushioning member has two longitudinally disposed parallel openings therethrough.

4. A bumper assembly as claimed in claim 1 wherein both of the fastening means consist of identical hat-shaped brackets having an imperforate U-shaped center segment and a perforate flange extending from each end of the center segment.

5. A dock fender comprising:
   (A) An elongated resilient impact cushioning member of substantially uniform cross section having a hollow interior and at least one continuous integral imperforate center wall, dividing the hollow interior into a plurality of longitudinally disposed parallel openings, and
   (B) A removable unitary bracket passing through at least one of the openings for fastening the cushioning member to an object to be cushioned
   (1) the bracket being substantially smaller in cross-section than the longitudinal opening in the cushioning member through which it passes,
   (2) said bracket when assembled with the cushioning member bearing against one side of said opening and leaving a substantial portion of the other side of the opening unfilled by the bracket thereby providing greater resilience of the cushioning member.

6. A resilient cushioning member for use in a bumper assembly of the type used to cushion the impact of a collision between a vehicle and another object comprising:
   (A) A body member of elastomeric material having:
       (1) A first pair of opposite parallel side walls;
       (2) A second pair of longer opposite parallel side walls integrally connected to the first pair of side walls to form a body of rectangular cross section;
       (3) A center wall integrally connected to the mid point of the second pair of walls;
           (a) Said center wall dividing the interior of the hollow body into two continuous longitudinal parallel openings; and
           (b) Both pairs of side walls and the center wall fully enclosing the parallel openings except at the ends of the body member thereof.

References Cited by the Examiner

UNITED STATES PATENTS

| | | | |
|---|---|---|---|
| 1,744,408 | 1/1930 | Millard | 293—71 |
| 1,781,403 | 12/1930 | Lyons | 114—220 |
| 2,144,357 | 1/1939 | Booharin | 293—88 |
| 2,874,669 | 2/1959 | Norman | 114—219 |
| 3,096,973 | 7/1963 | Bergen | 114—219 |

FOREIGN PATENTS 657,996  10/1951  Great Britain.

MILTON BUCHLER, *Primary Examiner.*

D. P. NOON, B. BELKIN, *Assistant Examiners.*